(12) United States Patent
Wallin et al.

(10) Patent No.: US 12,522,426 B2
(45) Date of Patent: Jan. 13, 2026

(54) SYSTEMS AND METHODS FOR SHIPPING CRYOGENICALLY-FROZEN MATERIALS

(71) Applicant: Kite Pharma, Inc., Santa Monica, CA (US)

(72) Inventors: Brian A. Wallin, Nashua, IA (US); Frank D. Obrad, Mansfield, TX (US); Craig T. Vermeyen, Santa Monica, CA (US)

(73) Assignee: Kite Pharm, Inc., Santa Monica, CA (US)

( * ) Notice: Subject to any disclaimer, the term of this patent is extended or adjusted under 35 U.S.C. 154(b) by 85 days.

(21) Appl. No.: 18/240,817

(22) Filed: Aug. 31, 2023

(65) Prior Publication Data

US 2024/0076117 A1    Mar. 7, 2024

Related U.S. Application Data

(60) Provisional application No. 63/374,346, filed on Sep. 1, 2022.

(51) Int. Cl.
| | | |
|---|---|---|
| *B65D 85/30* | (2006.01) | |
| *B65D 45/02* | (2006.01) | |
| *B65D 81/127* | (2006.01) | |
| *F17C 13/00* | (2006.01) | |

(52) U.S. Cl.
CPC ............. *B65D 85/30* (2013.01); *B65D 45/02* (2013.01); *B65D 81/1275* (2013.01); *F17C 13/006* (2013.01); *B65D 2201/00* (2013.01); *F17C 2270/0509* (2013.01)

(58) Field of Classification Search
CPC ......... B65D 85/30; F17C 13/00; F17C 13/006
USPC .................................................. 206/521–594
See application file for complete search history.

(56) References Cited

U.S. PATENT DOCUMENTS

| | | | |
|---|---|---|---|
| 3,207,354 A | 9/1965 | Skinner et al. | |
| 3,268,199 A | 8/1966 | Kordyban et al. | |
| 4,114,759 A * | 9/1978 | Maloney, Jr. ....... | B29C 45/0025 206/508 |
| 4,577,474 A * | 3/1986 | Peterson ................... | F25D 3/08 220/4.24 |
| 4,705,308 A * | 11/1987 | Bisbing ................... | E05C 19/14 292/108 |
| 6,381,981 B1 * | 5/2002 | Yaddgo ................. | A61B 50/00 62/457.2 |
| 8,887,515 B2 * | 11/2014 | Patstone ............... | F25D 11/003 62/530 |
| 11,667,458 B2 * | 6/2023 | McCully .............. | B65D 81/058 206/703 |

(Continued)

OTHER PUBLICATIONS

Intl. Search Report—Written Opinion dated Feb. 12, 2024 for Intl. Appl. No. PCT/US2023/031682.

*Primary Examiner* — Chun Hoi Cheung (57) ABSTRACT

Embodiments of the disclosure relate to shipping cases, dewars, and systems for transporting a frozen material. More specifically, the embodiments described herein include and/or enable dewar lid protective systems, data logging enablement, controlled coolant escape, efficient stacking options during transport, spill protection to ensure safe and effective transport of frozen samples and materials among other things. An exemplary use for the systems described herein includes reliable shipping for frozen materials at specified environmental conditions which can be tracked and verified.

13 Claims, 8 Drawing Sheets

(56) References Cited

U.S. PATENT DOCUMENTS

| | | | |
|---|---|---|---|
| 2006/0174648 A1 | 8/2006 | Lantz | |
| 2008/0208158 A1* | 8/2008 | Goodman | B65D 81/3862 |
| | | | 604/408 |
| 2012/0305435 A1* | 12/2012 | Matta | F25D 3/06 |
| | | | 206/521 |
| 2017/0343264 A1* | 11/2017 | McCormick | A01N 1/145 |
| 2018/0328644 A1* | 11/2018 | Rizzo | F25D 11/003 |
| 2020/0180845 A1* | 6/2020 | Mokhtarzadeh | B65D 81/3862 |
| 2022/0082317 A1* | 3/2022 | Bollinger | B65D 25/205 |
| 2022/0089353 A1* | 3/2022 | Mangelsen | F25D 3/08 |

* cited by examiner

SYSTEMS AND METHODS FOR SHIPPING CRYOGENICALLY-FROZEN MATERIALS

CROSS-REFERENCES TO RELATED APPLICATIONS

This application claims the benefit of priority to U.S. Provisional Patent Application No. 63/374,346, filed on Sep. 1, 2022, the entirety of which is incorporated by reference herein.

BACKGROUND

Traditional cryogenic dewars for shipping frozen samples and materials have long-standing deficiencies that have yet to be corrected. For example, traditional cryogenic dewars lack features to protect the lid of the cryogenic dewar from cracking during transit in the event a load is placed on the cryogenic dewar and/or the dewar falls on its top. In addition, traditional cryogenic dewars lack sophisticated lids which can safely house a data logging system during transit. Traditional cryogenic dewars also lack features for preventing unregulated escape of coolants (such as liquid nitrogen) during transport and/or storage of the frozen samples and materials. Traditional cryogenic dewars are not sized appropriately for cell therapy products.

Traditional shipping containers or cases for transporting cryogenic dewars also have long-standing deficiencies. For example, such traditional shipping containers or cases are incapable of being securely stacked during storage or transport. Also, traditional shipping containers or cases require cumbersome and heavy foam inserts for protecting the cryogenic dewar during transport. Such inserts are heavy, thick, and not finely tailored, thus leading to increased shipping costs and inefficient protection of the cryogenic dewar from vibrations and impacts. Traditional shipping containers or cases also include flimsy closing mechanisms such as clamps which prevent secure closing of the shipping container for preventing the cryogenic dewar from spilling out of the shipping container during transit. These features are traditionally assembled by the end user from commercial off-the-shelf products. Traditional shipping containers lack appropriate document holders and label placards necessary for shipping.

What is needed is a cryogenic dewar and shipping container to address the deficiencies described above and including dewar lid protective systems, data logging enablement, controlled coolant escape, efficient stacking options during transport, spill protection to ensure safe and effective transport of frozen samples and materials among other things. The systems described herein allow for reliable shipping options for frozen materials at specified environmental conditions which can be tracked and verified.

SUMMARY

Briefly, and in general terms, the present disclosure is directed to a shipping case. Such a shipping case may include a lined compartment including: a bottom; one or more walls extending from the bottom, such that the bottom and plurality of walls form a cavity and an opening for accessing the cavity, the opening disposed opposite the bottom; and a shock-absorbing lining disposed on an inner surface of the one or more walls and configured to accept a cryogenic shipping container. Such a shipping container may also include a lid configured to reversibly engage with the lined compartment such that the lid forms a seal over the lined compartment when the lid is engaged with the lined compartment. In such an embodiment, the shock-absorbing lining is up to 1.75 inches in thickness, or between 1 to 1.75 inches in thickness, or about 1 inch in thickness.

The present disclosure is also directed to a cryogenic dewar for shipping a frozen material. Such a cryogenic dewar may include an insulated housing including: a cavity for containing the frozen material; and a plurality of load-bearing handles disposed on an upper and outer surface of the insulated housing. Such a cryogenic dewar also includes a lid configured to reversibly engage with the insulated housing such that the lid forms a seal over the insulated housing when the lid is engaged with the insulated housing. In such an embodiment, the plurality of load-bearing handles extend in a vertical direction at least even with the lid when the lid is engaged with the insulated housing, and the lid is configured to reversibly house a condition monitoring system.

The present disclosure is also directed to a system for transporting a frozen material. The system may include a cryogenic dewar for shipping the frozen material, the cryogenic dewar including: an insulated housing including: a cavity for containing the frozen material; and a plurality of load-bearing handles disposed on an upper and outer surface of the insulated housing; and a dewar lid configured to reversibly engage with the insulated housing such that the dewar lid forms a seal over the insulated housing when the dewar lid is engaged with the insulated housing. The system may also include a shipping case configured to house the cryogenic dewar when in use, the shipping case including: a lined compartment including: a bottom; one or more walls extending from the bottom, such that the bottom and one or more walls form a cavity and an opening for accessing the cavity, the opening disposed opposite the bottom; and a shock-absorbing lining disposed on an inner surface of the one or more walls and configured to accept the cryogenic dewar; and a lid configured to reversibly engage with the lined compartment such that the lid forms a seal over the lined compartment when the lid is engaged with the lined compartment. In such a system, the plurality of load-bearing handles extend in a vertical direction at least even with the dewar lid when the lid is engaged with the insulated housing, the dewar lid is configured to reversibly house a condition monitoring system, and the shock-absorbing lining is up to 1.75 inches in thickness, or between 1 to 1.75 inches in thickness, or about 1 inch in thickness.

In various embodiments, the plurality of load-bearing handles extend in a vertical direction beyond the lid when the lid is engaged with the insulated housing.

Other aspects and advantages of the disclosed technologies detailed herein will become apparent from the following detailed description taken in conjunction with the accompanying drawings illustrating the principles of the technologies by way of example only.

BRIEF DESCRIPTION OF THE DRAWINGS

The teachings claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

DETAILED DESCRIPTION

The present disclosure addresses the need for a system for safely and effectively transporting a cryogenically frozen material. More specifically, the present disclosure addresses a need for a cryogenic dewar which includes features for protecting its lid during transit, a sophisticated lid which can safely house a data logging system during transit, and features for preventing unregulated escape of coolants (such as liquid nitrogen) during transport. The present disclosure also addresses a need for a shipping container capable of being securely stacked and palletized during storage or transport, that does not require cumbersome and heavy foam inserts for protecting a cryogenic dewar during transport, and reliable closing means to secure closing of the shipping container for preventing a cryogenic dewar from spilling out of the shipping container during transit. The disclosure addresses the need for document holders and placards necessary for shipping on the shipping container.

It will be understood that descriptions herein are exemplary and explanatory only and are do not limit the claims. In this application, the use of the singular includes the plural unless specifically stated otherwise.

All documents, or portions of documents, cited in this application, including but not limited to patents, patent applications, articles, books, and treatises, are hereby expressly incorporated by reference in their entirety for any purpose. As utilized in accordance with the present disclosure, the following terms, unless otherwise indicated, shall be understood to have the following meanings:

As used in this Specification and the appended claims, the singular forms "a," "an" and "the" include plural referents unless the context clearly dictates otherwise.

Unless specifically stated or obvious from context, as used herein, the term "or" is understood to be inclusive and covers both "or" and "and".

The term "and/or" where used herein is to be taken as specific disclosure of each of the two specified features or components with or without the other. Thus, the term "and/or" as used in a phrase such as "A and/or B" herein is intended to include A and B; A or B; A (alone); and B (alone). Likewise, the term "and/or" as used in a phrase such as "A, B, and/or C" is intended to encompass each of the following aspects: A, B, and C; A, B, or C; A or C; A or B; B or C; A and C; A and B; B and C; A (alone); B (alone); and C (alone).

The terms "e.g.," and "i.e." as used herein, are used merely by way of example, without limitation intended, and should not be construed as referring only those items explicitly enumerated in the specification.

The terms "or more", "at least", "more than", and the like, e.g., "at least one" are understood to include but not be limited to at least 1, 2, 3, 4, 5, 6, 7, 8, 9, 10, 11, 12, 13, 14, 15, 16, 17, 18, 19 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149 or 150, 200, 300, 400, 500, 600, 700, 800, 900, 1000, 2000, 3000, 4000, 5000 or more than the stated value. Also included is any greater number or fraction in between.

Conversely, the term "no more than" includes each value less than the stated value. Also included is any lesser number or fraction in between.

The terms "plurality", "at least two", "two or more", "at least second", and the like, are understood to include but not limited to at least 2, 3, 4, 5, 6, 7, 8, 9, 10, 11, 12, 13, 14, 15, 16, 17, 18, 19 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149 or 150, 200, 300, 400, 500, 600, 700, 800, 900, 1000, 2000, 3000, 4000, 5000 or more. Also included is any greater number or fraction in between.

Unless specifically stated or evident from context, as used herein, the term "about" refers to a value or composition that is within an acceptable error range for the particular value or composition as determined by one of ordinary skill in the art, which will depend in part on how the value or composition is measured or determined, i.e., the limitations of the measurement system. For example, "about" or "approximately" may mean within one or more than one standard deviation per the practice in the art. "About" or "approximately" may mean a range of up to 10% (i.e., ±10%). Thus, "about" may be understood to be within 10%, 9%, 8%, 7%, 6%, 5%, 4%, 3%, 2%, 1%, 0.5%, 0.1%, 0.05%, 0.01%, or 0.001% greater or less than the stated value. When particular values or compositions are provided in the instant disclosure, unless otherwise stated, the meaning of "about" or "approximately" should be assumed to be within an acceptable error range for that particular value or composition.

Units, prefixes, and symbols used herein are provided using their Système International de Unites (SI) accepted form. Numeric ranges are inclusive of the numbers defining the range.

As used throughout, the terms "shipping case" and "shipping container" are used interchangeably, and refer to a sealable container for housing and transporting a cryogenic dewar.

As used throughout, the terms "cryogenically-frozen", "frozen material" or "frozen sample" are used interchangeably and refer to materials that are to be stored and/or transported in a frozen or mostly frozen state at less than or equal to −150° C. Non-limiting example materials include biological samples from donors, biological reagents, biological compositions, etc.

As used throughout, the terms "shock-absorbing lining" or "shock-absorbing material" are interchangeably and refer to a material that reduces the critical acceleration and critical velocity of an item experiencing an impact due to shock and/or vibration. The material shall also have rebound characteristics to absorb multiple shock and vibration events. An example can be made from nano-tech foam of at least 1 inch in thickness In other embodiments, the nano-tech foam is between approximately 1 to 2.25 inches in thickness. In other embodiments, the nano-tech foam is between 1 to 1.75 inches in thickness.

As used throughout, the term "data logger" refers to a system that monitors and records temperature data and stores it locally. A non-limiting example of a data logger includes the HOBO device. (Onset Computer Corporation, MA, USA)

As used throughout, the term "cryogenic dewar" refers to specialized type of vacuum flask used for storing cryogens or cooling agents (such as liquid nitrogen or liquid helium), whose boiling points are much lower than room temperature. Cryogenic dewars may take several different forms including open buckets, flasks with loose-fitting stoppers and self-pressurizing tanks. All dewars have walls constructed from two or more layers, with a high vacuum maintained between the layers. This provides very good thermal insulation between the interior and exterior of the dewar, which reduces the rate at which the contents boil away. Precautions are taken in the design of dewars to safely manage the gas which is released as the liquid slowly boils. The simplest dewars allow the gas to escape either through an open top or past a loose-fitting stopper to prevent the risk of explosion. More sophisticated dewars trap the gas above the liquid and hold it at high pressure. This increases the boiling point of the liquid, allowing it to be stored for extended periods. Excessive vapor pressure is released automatically through safety valves. In embodiments throughout, the cryogenic dewar is configured to allow the transport and/or storage of a frozen material or sample.

As used throughout, the term "condition monitoring system" refers to a system which monitors environmental conditions such as internal and external temperatures, tilt, GPS location, battery life, pressure, humidity, light exposure, shock, and vibration, etc., with the ability to transmit data to a web portal in real time. A non-limiting example of a conditioning monitoring system includes the Sendum PT300D/4G. (Sendum Wireless Corp. BC, CA)

The terms "hydrophobic fleece-covered vapor plug" and "vapor plug at least partially covered by a hydrophobic fleece" are used interchangeably and refer to a specific type of vapor plug used. Dry vapor shippers may use a vapor plug typically made of EPS. A hydrophobic fleece-covered vapor plug covers the EPS with a hydrophobic fleece to slow the rate of nitrogen vapor escape while also preventing freezing and icing that could create a pressure vessel. In various embodiments, the vapor plug is encased with a hydrophobic fleece. Non-limiting examples of a hydrophobic fleece include spun high-density polypropylene that is spun into a fleece. In various embodiments, the hydrophobic fleece is configured to allow escape of liquid nitrogen vapors (or other cooling gases) from the insulated housing of said cryogenic dewar at a controlled rate.

Unless defined otherwise, all technical and scientific terms used herein have the same meaning as commonly understood by one of ordinary skill in the art to which this disclosure is related.

In various embodiments, the system may include a shipping case. In various embodiments, the shipping case may include a lined compartment. In various embodiments, the shipping case may include a bottom. In various embodiments, the shipping case may include one or more walls extending from the bottom. In various embodiments, the bottom and plurality of walls may form a cavity and an opening for accessing the cavity. In various embodiments, the opening may be disposed opposite the bottom. In various embodiments, the shipping case may include a shock-absorbing lining disposed on an inner surface of the one or more walls and configured to accept a cryogenic shipping container. In various embodiments, the shipping container may also include a lid configured to reversibly engage with the lined compartment such that the lid forms a seal over the lined compartment when the lid is engaged with the lined compartment. In various embodiments, the shock-absorbing lining may be up to 1.75 inches in thickness, or between 1 to 1.75 inches in thickness, or about 1 inch in thickness.

In various embodiments, the shipping case may further include a plurality of draw latches. In various embodiments, each of the plurality of draw latches may include a first member disposed on the lined compartment and a corresponding second member disposed on the lid. In various embodiments, the plurality of draw latches may be configured to reversibly couple the lid to the lined compartment when each of the first members are engaged with the corresponding second members.

In various embodiments, the lined compartment may further form a plurality of openings. In various embodiments, each of the plurality of openings may be configured to accept a fastener for securing the plurality of draw latches.

In various embodiments, the lid may further include a ridge structure disposed on an outer and top surface of the lid. In various embodiments, the bottom may further form a slot disposed on an outer and bottom surface of the bottom. In various embodiments, the slot may be configured to accept the ridge structure such that a pair of shipping cases can be stacked on top of one another such that a first container including the slot can be secured onto a second shipping container including the ridge structure.

In various embodiments, the bottom may be configured to reversibly couple to a pallet for facilitated transportation.

In various embodiments, the shipping case may further include a label plaque attached to an outer surface of at least one of the one or more walls.

In various embodiments, the shock-absorbing lining may form a plurality of recessed air vents for facilitated insertion and removal of the cryogenic shipping container.

In various embodiments, the shock-absorbing layer may form a slot configured to reversibly secure a data logger.

In various embodiments, the system may include a cryogenic dewar for shipping a frozen material. In various embodiments, the cryogenic dewar may include an insulated housing. In various embodiments, the insulated housing may include a cavity for containing the frozen material and a plurality of load-bearing handles disposed on an upper and outer surface of the insulated housing. In various embodiments, the cryogenic dewar may also include a lid configured to reversibly engage with the insulated housing such that the lid forms a seal over the insulated housing when the lid is engaged with the insulated housing. In such an embodiment, the plurality of load-bearing handles extend in a vertical direction at least even with the lid when the lid is engaged with the insulated housing, and the lid is configured to reversibly house a condition monitoring system.

In various embodiments, the plurality of load-bearing handles may extend in a vertical direction beyond the lid when the lid is engaged with the insulated housing.

In various embodiments, the cryogenic dewar for shipping a frozen material above further includes a temperature-probe locking system reversibly coupled to an inside surface of the cavity.

In various embodiments, the cryogenic dewar for shipping a frozen material further includes a vapor plug at least partially encased with a hydrophobic fleece over the vapor plug. In various embodiments, the hydrophobic fleece may be configured to allow escape of liquid nitrogen vapors from insulated housing of the cryogenic dewar at a reduced rate.

In various embodiments, the cryogenic dewar may include an insulated housing. In various embodiments, the insulated housing may include a cavity for containing the frozen material and a plurality of load-bearing handles disposed on an upper and outer surface of the insulated housing. In various embodiments, the cryogenic dewar may include a dewar lid configured to reversibly engage with the insulated housing such that the dewar lid forms a seal over the insulated housing when the dewar lid is engaged with the insulated housing.

In various embodiments, the system may also include a shipping case configured to house the cryogenic dewar. In various embodiments, the shipping case may include a lined compartment. In various embodiments, the lined compartment may include a bottom and one or more walls extending from the bottom such that the bottom and one or more walls form a cavity and an opening for accessing the cavity. In various embodiments, the opening may be disposed opposite the bottom. In various embodiments, a shock-absorbing lining may be disposed on an inner surface of the one or more walls and configured to accept the cryogenic dewar. In various embodiments, the shipping case may include a lid configured to reversibly engage with the lined compartment such that the lid forms a seal over the lined compartment when the lid is engaged with the lined compartment. In such a system, the plurality of load-bearing handles extend in a vertical direction at least even with the dewar lid when the lid is engaged with the insulated housing. In various embodiments, the dewar lid may be configured to house a condition monitoring system. In various embodiments, the shock-absorbing lining may be up to 1.75 inches in thickness, or between 1 to 1.75 inches in thickness, or about 1 inch in thickness.

In various embodiments, the plurality of load-bearing handles may extend in a vertical direction beyond the lid when the lid is engaged with the insulated housing.

In various embodiments, the system for transporting a frozen material above may further include a temperature-probe locking system reversibly coupled to an inside surface of the cavity.

In various embodiments, the system for transporting a frozen material may further include a vapor plug at least partially encased with a hydrophobic fleece over the vapor plug. In various embodiments, the hydrophobic fleece may be configured to allow the escape of liquid nitrogen vapors from insulated housing of the cryogenic dewar at a reduced rate.

In various embodiments, the system for transporting a frozen material above may further include a plurality of draw latches. In various embodiments, each of the plurality of draw latches may include a first member disposed on the lined compartment and a corresponding second member disposed on the lid. In various embodiments, the plurality of draw latches may be configured to reversibly couple the lid to the lined compartment when each of the first members are engaged with the corresponding second members.

In various embodiments, the lined compartment may form a plurality of openings. In various embodiments, each of the plurality of openings may be configured to accept a fastener for securing the plurality of draw latches.

In various embodiments, the lid of the shipping container may further include a ridge structure disposed on an outer and top surface of the lid. In various embodiments, the bottom of the shipping container may further form a slot disposed on an outer and bottom surface of the bottom. In various embodiments, the slot may be configured to accept the ridge structure such that a pair of shipping cases can be stacked on top of one another such that a first container including the slot can be secured onto a second shipping container including the ridge structure.

In various embodiments, the bottom of the shipping container may be configured to reversibly couple to a pallet for facilitated transportation.

In various embodiments, the shipping container may include a label plaque attached to an outer surface of at least one of the one or more walls.

In various embodiments, the shock-absorbing lining of the shipping container may form a plurality of recessed air vents for facilitated insertion and removal of the cryogenic shipping container.

In various embodiments, the shock-absorbing layer of the shipping container forms a slot configured to reversibly secure a data logger.

Various embodiments are described in further detail in the following description.

As shown in FIGS. 1-8, various embodiments of the disclosure include a system 101 for transporting a frozen material. In various embodiments, the system 101 may include a cryogenic dewar 103 for shipping the frozen material and a shipping case 105 configured to house the cryogenic dewar 103. In various embodiments, the cryogenic dewar 103 may include an insulated housing 107 which may form a cavity 109 for containing the frozen material. In various embodiments, the cryogenic dewar 103 may include a plurality of load-bearing handles 111 disposed on an upper and outer surface of the insulated housing 107. In various embodiments, the cryogenic dewar 103 may also include a dewar lid 113 configured to reversibly engage with the insulated housing 107 such that the dewar lid 113 forms a seal over the insulated housing 107 when the dewar lid 113 is engaged with the insulated housing 107. In various embodiments, the load-bearing handles 111 may extend in a vertical direction at least even with the dewar lid 113 when the lid 113 is engaged with the insulated housing 107. In various embodiments, the dewar lid 113 may be configured to house a condition monitoring system 121.

In various embodiments, the shipping case 105 of the system 101 may be configured to house the cryogenic dewar 103 when in use. In various embodiments, the shipping case 105 may include a lined compartment 115. In various embodiments, the lined compartment 115 may be made of a bottom and one or more walls extending from the bottom such that the bottom and the one or more walls form a cavity and an opening for accessing the cavity. In various embodiments, the opening may be disposed opposite the bottom. In various embodiments, a shock-absorbing lining 117 may be disposed on an inner surface of the one or more walls and may be configured to accept the cryogenic dewar 103. In the shipping case 105 of FIGS. 1 and 5-8, the shock-absorbing lining 117 covers most (if not all) of the cavity of the lined compartment 115, in accordance with various embodiments. The shipping case 105 also may include a lid 119 configured to reversibly engage with the lined compartment 115. In various embodiments, the lid 119 may form a seal over the lined compartment 115 when the lid 119 is engaged with the lined compartment 115. In various embodiments, the shock-absorbing lining 117 may be up to 2 inches in thickness. In various embodiments, the shock-absorbing lining 117 in FIGS. 1, 6, and 7 may be at least 1 inch thick and may be made of a nano-tech foam. More specifically, the shock-absorbing lining may approximately 1 inch thick along the walls, and at least 1 inch thick at the corners, according to various embodiments. In various embodiments, the nano-tech foam may be integrated into the shipping case 105 to envelope the cryogenic dewar 103 while in transit. In various embodiments, the nanotech foam may disperse shock energy during travel and may have increased shock absorption properties over traditional foam inserts. In various embodiments, the use of this new nano-tech foam may allow for use of thinner foam layers in transit. This may result in reduced weight and reduced costs in shipping. In various embodiments, the nano-tech foam layer can be reduced from 2 inches to 1 inch, thus making the entire shipping case 105 container smaller if needed. Other, non-limiting examples of shock-absorbing materials include polyethylene foam and polypropylene foam of approximately 2 inches in thickness.

FIGS. 2-7 depict additional features of the cryogenic dewar 103, according to various embodiments. In various embodiments, the plurality of load-bearing handles 111 may extend in a vertical direction beyond the dewar lid 113 when the dewar lid 113 is engaged with the insulated housing 107. In various embodiments, the plurality of load bearing handles 111 may extend to at least the height of the dewar lid 113 when engaged. In various embodiments, the plurality of load bearing handles 111 may be positioned so they can absorb a load if such a load is placed on top of the shipping case 105. Thus, plurality of load bearing handles 111 may have a specific height to offer further protection to the lid 113 and top of the cryogenic dewar 103, according to various embodiments.

Figure 1:
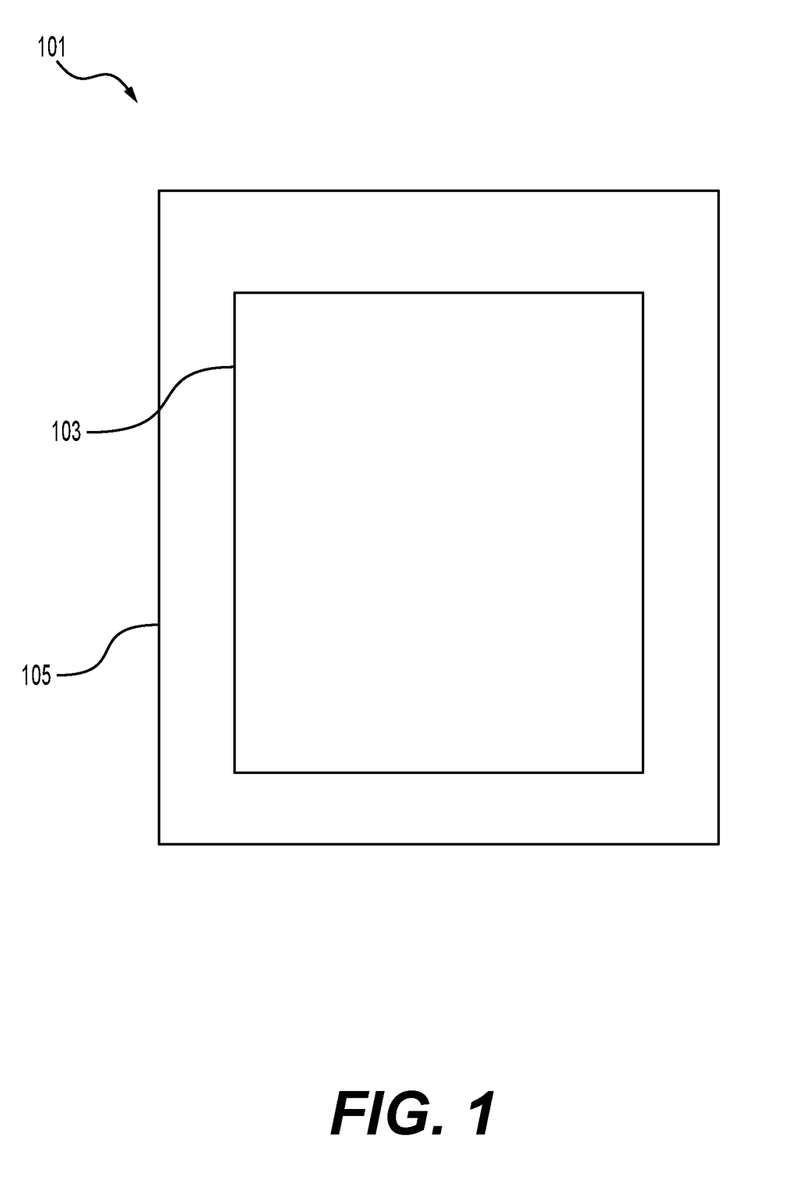
FIG. 1 is a schematic of a system for transporting a frozen material, in accordance with various embodiments.
Figure 2:
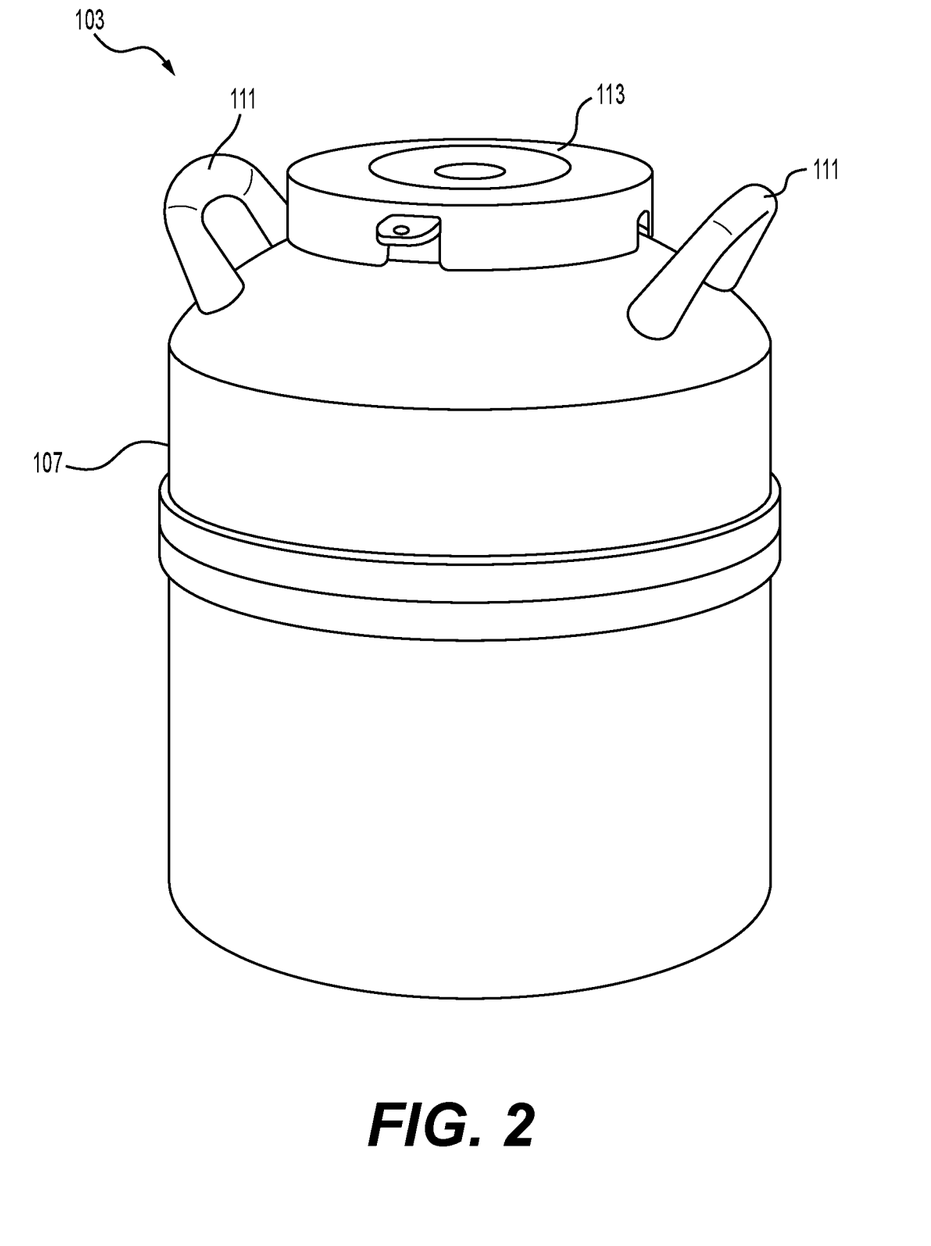
FIG. 2 is a side view of a cryogenic dewar, in accordance with various embodiments.
Figure 3:
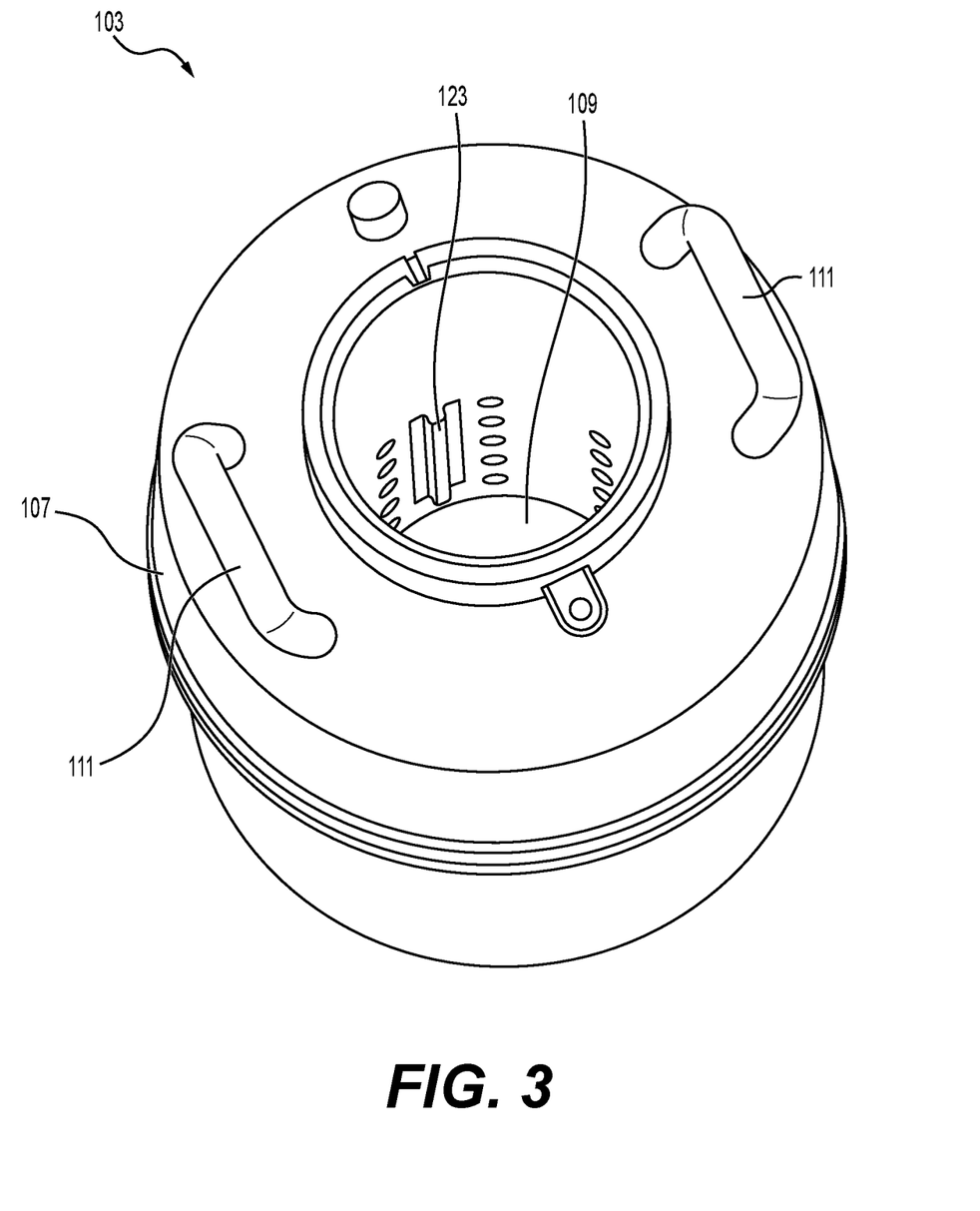
FIG. 3 is a top, perspective view of the cryogenic dewar of FIG. 2, in accordance with various embodiments.
Figure 4:
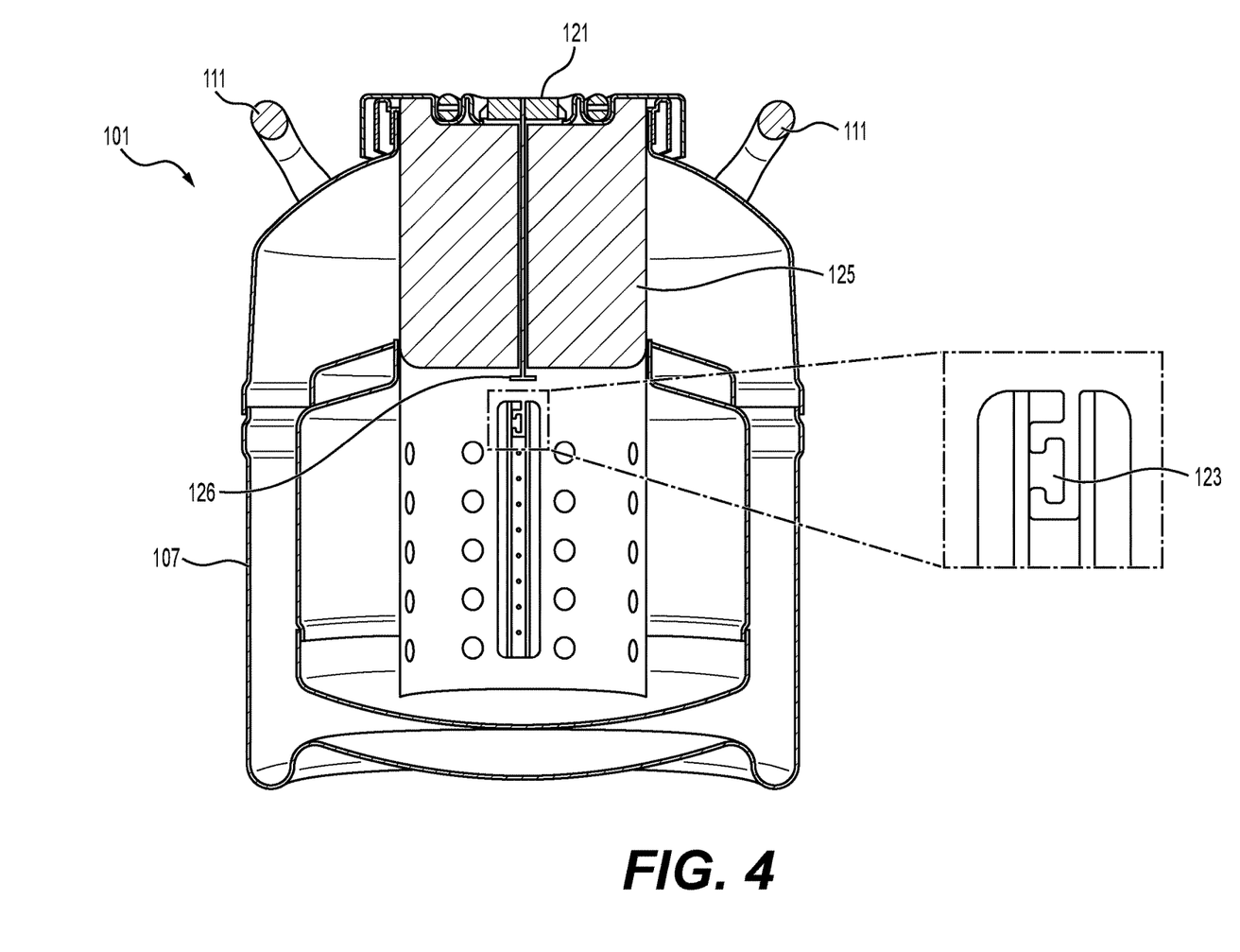
FIG. 4 is a cross-sectional view of the cryogenic dewar of FIG. 2, in accordance with various embodiments.
Figure 5:
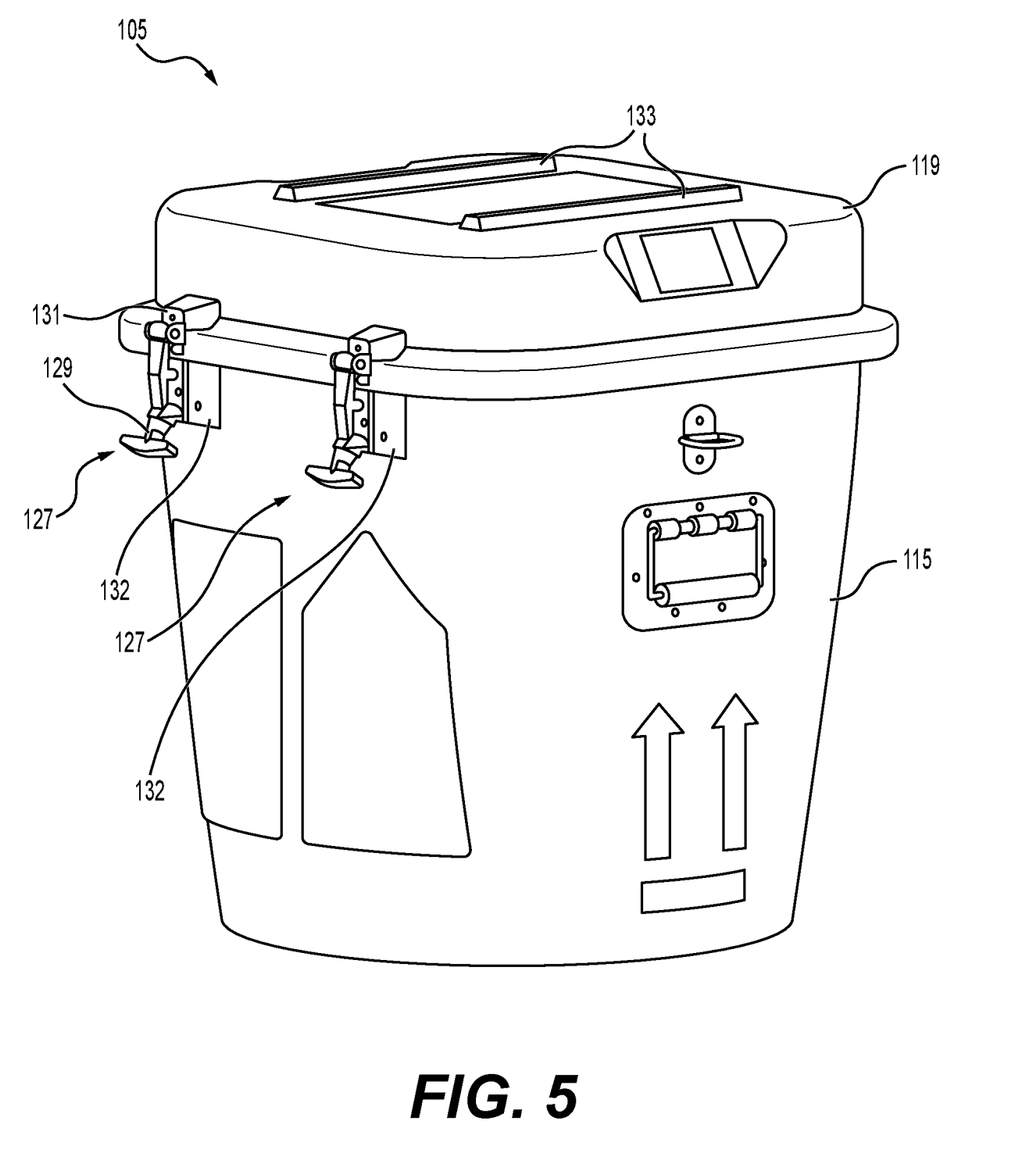
FIG. 5 is a side, perspective view of a shipping case, in accordance with various embodiments.

In various embodiments, the cryogenic dewar 103 may also include a temperature-probe locking system 123 reversibly coupled to an inside surface of the dewar cavity 109. FIG. 4 illustrates the temperature-probe locking system 123 as a screwless, easy to use probe-locking feature, according to various embodiments. In various embodiments, the cryogenic dewar 103 also may include a traditional EPS vapor plug 125 encased with a hydrophobic fleece over the vapor plug. In various embodiments, the hydrophobic fleece may be configured to allow escape of liquid nitrogen vapors from the insulated housing 107 at a reduced rate while releasing pressure from inside the dewar. As seen in FIG. 4, and discussed herein, the dewar lid 113 may be configured to reversibly house a condition monitoring system 121, according to various embodiments. A non-limiting example of the condition monitoring system includes a Sendum PT300D with Bluetooth-enabled temperature probe. In the embodiments of FIG. 4, the cryogenic dewar also includes a disc temperature probe 126, according to various embodiments.

FIGS. 5-8 depict additional features of the shipping case 105 of the system 101, according to various embodiments. In various embodiments, the shipping case 105 may also include a plurality of draw latches 127. In various embodiments, each of the plurality of draw latches 127 have a first member 129 disposed on the lined compartment 115 and a corresponding second member 131 disposed on the shipping case lid 119. In various embodiments, the plurality of draw latches 127 may be configured to reversibly couple to the shipping case lid 119 to the lined compartment 115 when each of the first members 129 are engaged with the corresponding second members 131. In various embodiments, the draw latches 127 may be distinct from previously used fastening mechanisms in shipping containers. Previously, toggle clamps have traditionally been used. Such clamps can become undone during transit due to the size of the shipping container. Here, the draw latches 127 absorb vibrations and do not become unlocked, thereby, solving this unmet need.

In various embodiments, the lined compartment 115 of the shipping case 105 may form a plurality of openings 132. In various embodiments, each of the plurality of openings 132 may be configured to accept a fastener for securing the plurality of draw latches 127. In FIGS. 5-8, the plurality of openings 132 may be molded through-holes which allow sealing of the draw latches 127 with cable ties, according to various embodiments. Additional non-limiting examples of acceptable ties include zip ties, padlocks, steel wire, serialized seals, etc.

Figure 8:
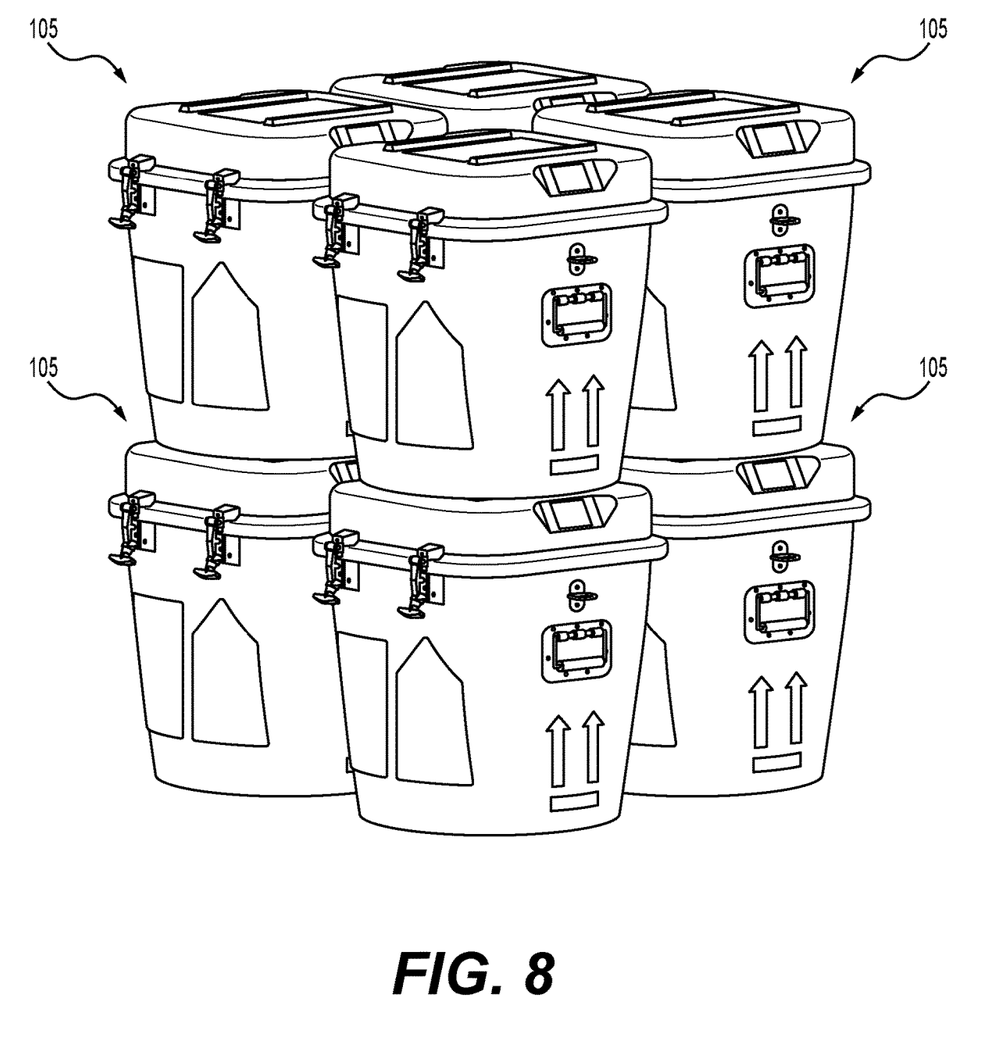
FIG. 8 is an illustration of multiple systems for transporting frozen materials stacked on top of one another, in accordance with various embodiments.

In various embodiments, the shipping case lid 119 may include a plurality of ridge structures 133 disposed on an outer and top surface of the shipping case lid 119. In various embodiments, the bottom of the shipping case 105 forms a plurality of slots (not shown) disposed on an outer and bottom surface of the bottom of the shipping case 105. As shown in FIG. 8, the plurality of slots may be configured to accept the plurality of ridge structures 133 so that a pair of shipping cases can be stacked on top of one another such that a first shipping container having the plurality of slots can be secured onto a second shipping container having the plurality of ridge structures 133, according to various embodiments. The bottom of the shipping case 105 may also be configured to reversibly couple to a pallet for facilitated transportation.

Figure 6:
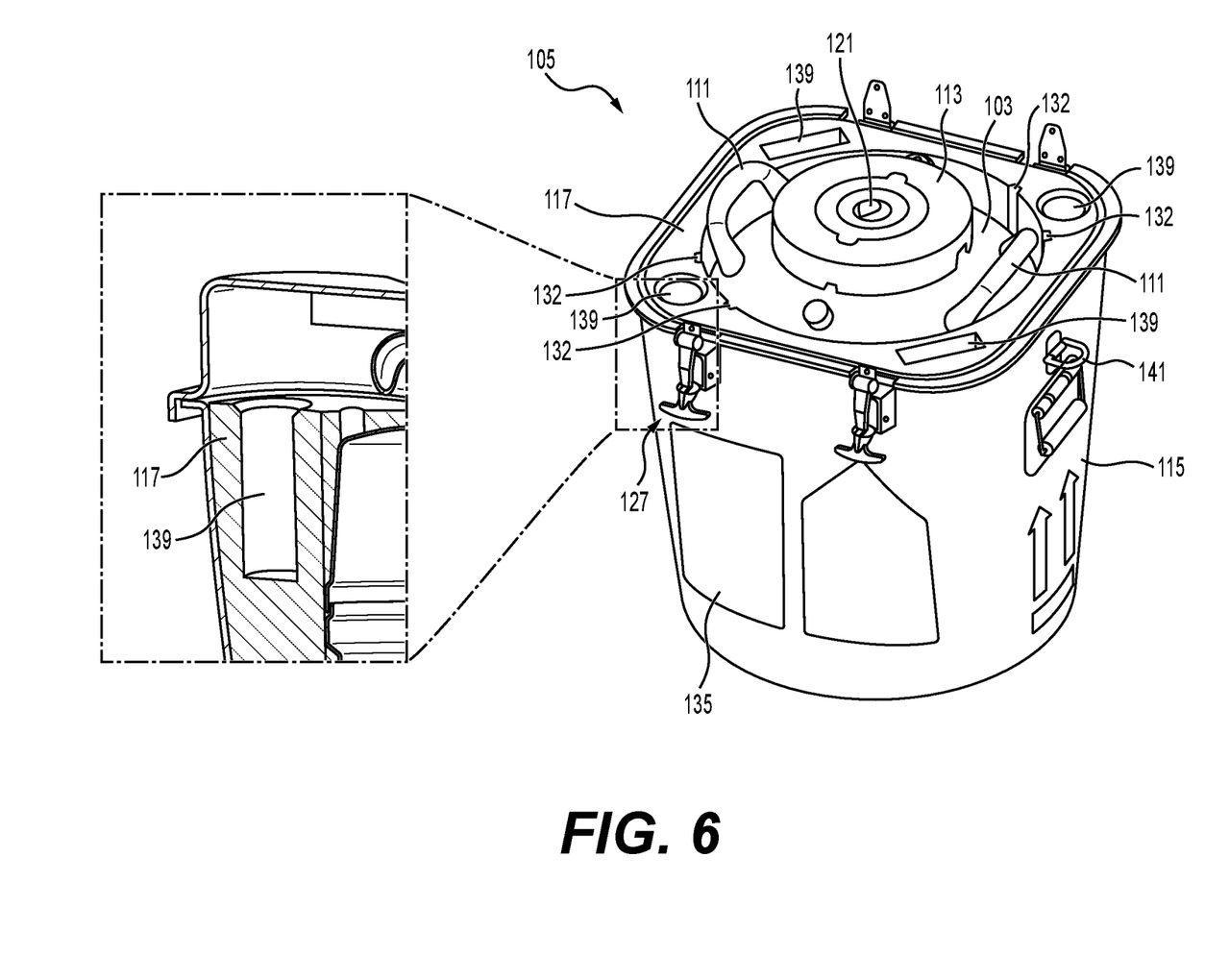
FIG. 6 is top, perspective view and a side, cross-sectional view of the shipping case of FIG. 5 including a cryogenic dewar, in accordance with various embodiments.

As shown in FIG. 6, the shipping case 105 may also include a label plaque 135 attached to an outer surface, according to various embodiments. Traditionally, labels may be adhered to a shipping container and as such can become damaged or lost in transit. In various embodiments, the label plaques 135 described herein may include pockets built into the shipping case 105 for including labels. Such a feature and fixed location also creates uniformity in location of the label.

In various embodiments, the shock-absorbing lining 117 of the shipping case 105 forms a plurality of recessed air vents 137 for facilitated insertion and removal of the cryogenic shipping container 103. In various embodiments, the shock-absorbing layer also forms a plurality of slots 139 configured to reversibly secure a data logger or other items for shipping. As seen in FIG. 6, an example slot 139 may include a cylindrical cutout made to house a rolled-up document during transport. Also as seen in FIG. 6, the shipping case 105 also include at least one D-ring 141 for accepting a stacking strap to facilitate stacking of shipping cases, according to various embodiments.

Figure 7:
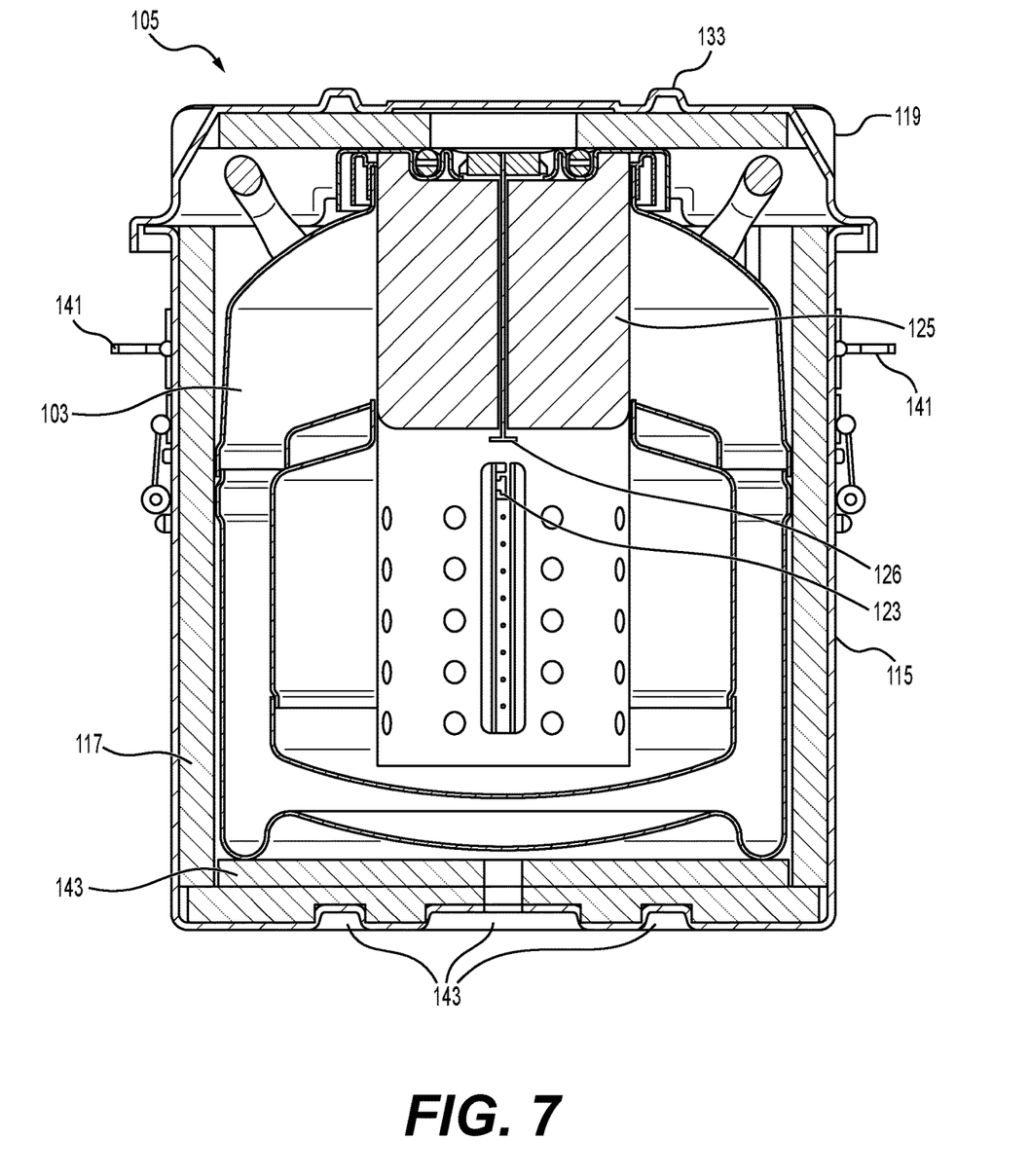
FIG. 7 is a side and cross-sectional view of the shipping case and cryogenic dewar of FIG. 6, in accordance with various embodiments.

As seen in FIG. 7, the shipping case 105 may also include a removable bottom foam piece which can be used for mounting a lid data logger 143, according to various embodiments. The shipping case may also include a plurality of recessed air vent holes 145 for facilitating cryogenic dewar 103 removal, according to various embodiments.

As seen in FIG. 8, the shipping case 105 may be designed to be stackable with other similar shipping cases 105 for facilitated transport and shipping, according to various embodiments. In various embodiments, such a stackable application may be mediated by the combination of at least the following properties of the shipping cases 105: the square/rectangular design of the shipping case 105, the flat lid 119, and the plurality of ridge structures 133 on the lids 119 and their corresponding slots on the bottoms of adjoining shipping cases 105 for accepting/mating to the ridge structures 133. Previous liquid nitrogen shipping containers have round tops making stacking impossible.

One skilled in the art will realize the subject matter may be embodied in other specific forms without departing from the spirit or essential characteristics thereof. The foregoing embodiments are therefore to be considered in all respects illustrative rather than limiting of the subject matter described herein.

We claim:

1. A cryogenic dewar for shipping a frozen material comprising:
    an insulated housing comprising:
        a cavity for containing said frozen material; and
        a plurality of load-bearing handles disposed on an upper and outer surface of said insulated housing; and
    a lid configured to reversibly engage with said insulated housing such that said lid forms a seal over said insulated housing when said lid is engaged with said insulated housing,
    wherein said plurality of load-bearing handles extend in a vertical direction at least even with said lid when said lid is engaged with said insulated housing,
    wherein said lid is configured to reversibly house a condition monitoring system; and
    a vapor plug at least partially encased with a hydrophobic fleece over the vapor plug, such that said hydrophobic fleece is configured to allow escape of liquid nitrogen vapors from insulated housing of said cryogenic dewar at a reduced rate.

2. The cryogenic container of claim 1, wherein said plurality of load-bearing handles extend in a vertical direction beyond said lid when said lid is engaged with said insulated housing.

3. The cryogenic container of claim 2, further comprising a temperature-probe locking system reversibly coupled to an inside surface of said cavity.

4. A system for transporting a frozen material comprising:
    a cryogenic dewar for shipping said frozen material comprising:
        an insulated housing comprising:
            a cavity for containing said frozen material; and
            a plurality of load-bearing handles disposed on an upper and outer surface of said insulated housing; and
        a dewar lid configured to reversibly engage with said insulated housing such that said dewar lid forms a seal over said insulated housing when said dewar lid is engaged with said insulated housing; and
    a shipping case configured to house said cryogenic dewar when in use, said shipping case comprising:
        a lined compartment comprising:
            a bottom;
            one or more walls extending from said bottom, such that said bottom and one or more walls form a cavity and an opening for accessing said cavity, said opening disposed opposite said bottom; and
            a shock-absorbing lining disposed on an inner surface of said one or more walls and configured to accept said cryogenic dewar;
        a lid configured to reversibly engage with said lined compartment such that said lid forms a seal over said lined compartment when said lid is engaged with said lined compartment,
        wherein said plurality of load-bearing handles extend in a vertical direction at least even with said dewar lid when said lid is engaged with said insulated housing,
        wherein said dewar lid is configured to reversibly house a condition monitoring system, and
        wherein said shock-absorbing lining is up to 1.75 inches in thickness, or between 1 to 1.75 inches in thickness, or about 1 inch in thickness; and
        a vapor plug at least partially encased with a hydrophobic fleece over the vapor plug, such that said hydrophobic fleece is configured to allow escape of liquid nitrogen vapors from insulated housing of said cryogenic dewar at a reduced rate.

5. The system of claim 4, wherein said plurality of load-bearing handles extend in a vertical direction beyond said lid when said lid is engaged with said insulated housing.

6. The system of claim 5, further comprising a temperature-probe locking system reversibly coupled to an inside surface of said cavity.

7. The system of claim 4, further comprising a plurality of draw latches, each of said plurality of draw latches comprising a first member disposed on said lined compartment and a corresponding second member disposed on said lid, and such that said plurality of draw latches are configured to reversibly couple said lid to said lined compartment when each of said first members are engaged with said corresponding second members.

8. The system of claim 7, wherein said lined compartment further forms a plurality of openings, each of said plurality of openings configured to accept a fastener for securing said plurality of draw latches.

9. The system of claim 8, wherein said lid further comprises a ridge structure disposed on an outer and top surface of said lid,
    wherein said bottom further forms a slot disposed on an outer and bottom surface of said bottom, and
    wherein said slot is configured to accept said ridge structure such that a pair of shipping cases can be stacked on top of one another such that a first container comprising said slot can be secured onto a second shipping container comprising said ridge structure.

10. The system of claim 9, wherein said bottom is configured to reversibly couple to a pallet for facilitated transportation.

11. The system of claim 10, further comprising a label plaque attached to an outer surface of at least one of said one or more walls.

12. The system of claim 11, wherein said shock-absorbing lining forms a plurality of recessed air vents for facilitated insertion and removal of said cryogenic shipping container.

13. The system of claim 12, wherein said shock-absorbing layer forms a slot configured to reversibly secure a data logger.

* * * * *